United States Patent [19]
Hulsebosch

[11] Patent Number: 5,369,786
[45] Date of Patent: Nov. 29, 1994

[54] ENHANCED POWER LEVEL USAGE IN A RADIOTELEPHONE SYSTEM

[75] Inventor: Thomas G. Hulsebosch, Palatine, Ill.

[73] Assignee: Motorola, Inc., Schaumburg, Ill.

[21] Appl. No.: 694,153

[22] Filed: May 1, 1991

[51] Int. Cl.$^5$ .............................................. H04B 7/26
[52] U.S. Cl. .................................... 455/70; 455/54.1; 455/56.1; 455/67.1; 455/127
[58] Field of Search .................... 455/70, 50.1, 52.1, 455/33, 34, 63, 127, 343, 33.1, 38.3, 54.1, 34.1, 56.1, 62, 67.1, 68, 69; 379/63

[56] References Cited

U.S. PATENT DOCUMENTS

| | | |
|---|---|---|
| 4,613,990 | 9/1986 | Halpern . |
| 4,696,027 | 9/1987 | Bonta ................................. 455/33 |
| 5,042,082 | 8/1991 | Damlin ................................. 455/33 |

FOREIGN PATENT DOCUMENTS

| | | |
|---|---|---|
| 0372759 | 11/1989 | European Pat. Off. . |
| 2229609 | 2/1990 | United Kingdom . |

*Primary Examiner*—Edward F. Urban
*Assistant Examiner*—Chi Pham
*Attorney, Agent, or Firm*—Richard A. Sonnentag

[57] ABSTRACT

A radiotelephone system allows a subscriber unit (125) to transmit above a predetermined maximum power level. The maximum power level is set at a source base-station (130) and corresponds to the maximum power level a subscriber unit (125) can transmit at without subjecting neighboring target base-stations to interference. When the received signal strength indication (RSSI) of the subscriber unit (125) as measured by the source base-station (130) falls below a transfer threshold, the radiotelephone system determines if the subscriber unit (125) is in the best sector/cell. If the subscriber unit (125) is in the best sector/cell, the subscriber unit (125) is allowed to transmit at a power level above the predetermined maximum to maintain communication to the source base-station (130).

27 Claims, 4 Drawing Sheets

ENHANCED POWER LEVEL USAGE IN A RADIOTELEPHONE SYSTEM

FIELD OF THE INVENTION

The invention relates generally to radiotelephone systems and more specifically to radiotelephone systems requiring handoff to maintain communication to a subscriber.

BACKGROUND OF THE INVENTION

In radiotelephone systems, subscribers transmit at multiple power levels to maintain communication to a base-station as the subscriber moves throughout a particular coverage area. The use of multiple power levels is necessary because, as a subscriber moves away from the base-station it is communicating with, its effective received signal strength as measured by the base-station decreases. When the received signal strength falls below a particular threshold, the quality of communication may begin to degrade. To avoid the degradation, the base-station will instruct the subscriber to transmit at the next highest power level. This effectively increases the received signal strength of the subscriber transmission as measured by the base-station, thus avoiding the signal quality degradation.

As reuse patterns become closer and closer together, a restriction on the power level that the subscriber transmits is required. This is typically accomplished by setting a parameter that defines the maximum power level (MAXPL) the subscriber can transmit while it is being serviced by the current source base-station in a given sector/cell. The parameter is typically determined at the cell site planning stages and is typically set so that the maximum allowable power level that the subscriber is able to transmit at is below the available power level of the subscriber. This is done so that the subscriber causes the least amount of interference to neighboring coverage areas during its transmission.

A problem arises however, when a subscriber goes into a somewhat concealed infrastructure, a parking garage or a building for example. Since the power level is restricted to the MAXPL level, the probability of the subscriber being able to communicate to the source base-station decreases. In addition, the MAXPL algorithm used at the source base-station limits the power level all the time, instead of only when the mobile is out of the coverage area of the serving cell. This problem, initially implemented to decrease interference between neighboring coverage areas, has lead to an increased number of dropped calls.

Thus, a need exists for a radiotelephone system which allows the subscriber to transmit above the MAXPL limit when the subscriber is in the best sector/cell while still limiting the amount of interference caused by the subscriber during typical radiotelephone operation.

SUMMARY OF THE INVENTION

A radiotelephone system has enhanced maximum power level usage and has a source base-station coupled to a plurality of target base-stations via a base-station interface. The source base-station communicates with a subscriber unit on a radio frequency (RF) channel, has the capability to instruct the subscriber unit to transmit at at least one of a plurality of RF power levels, and has a predetermined maximum subscriber unit transmission level value which corresponds to a predetermined subscriber unit RF power level below the maximum subscriber unit RF power level. The radiotelephone system provides, at the source base-station, at least a first communication transfer threshold. The radiotelephone system measures, at the source base-station, a first signal quality value of a transmission on the radio frequency channel and also measures, at at least one target base-station, at least a second signal quality value of a transmission on the radio frequency channel. The radiotelephone system determines, at the base-station interface, an optimum signal quality value of the first signal quality value and at least the second signal quality value, and instructs, at the source base-station, the subscriber unit to transmit at a level above the predetermined subscriber unit RF power level when the first signal quality value is less .than at least the first communication transfer threshold and when the first signal quality value is the optimum signal quality value.

DETAILED DESCRIPTION OF A PREFERRED EMBODIMENT

Figure 1:
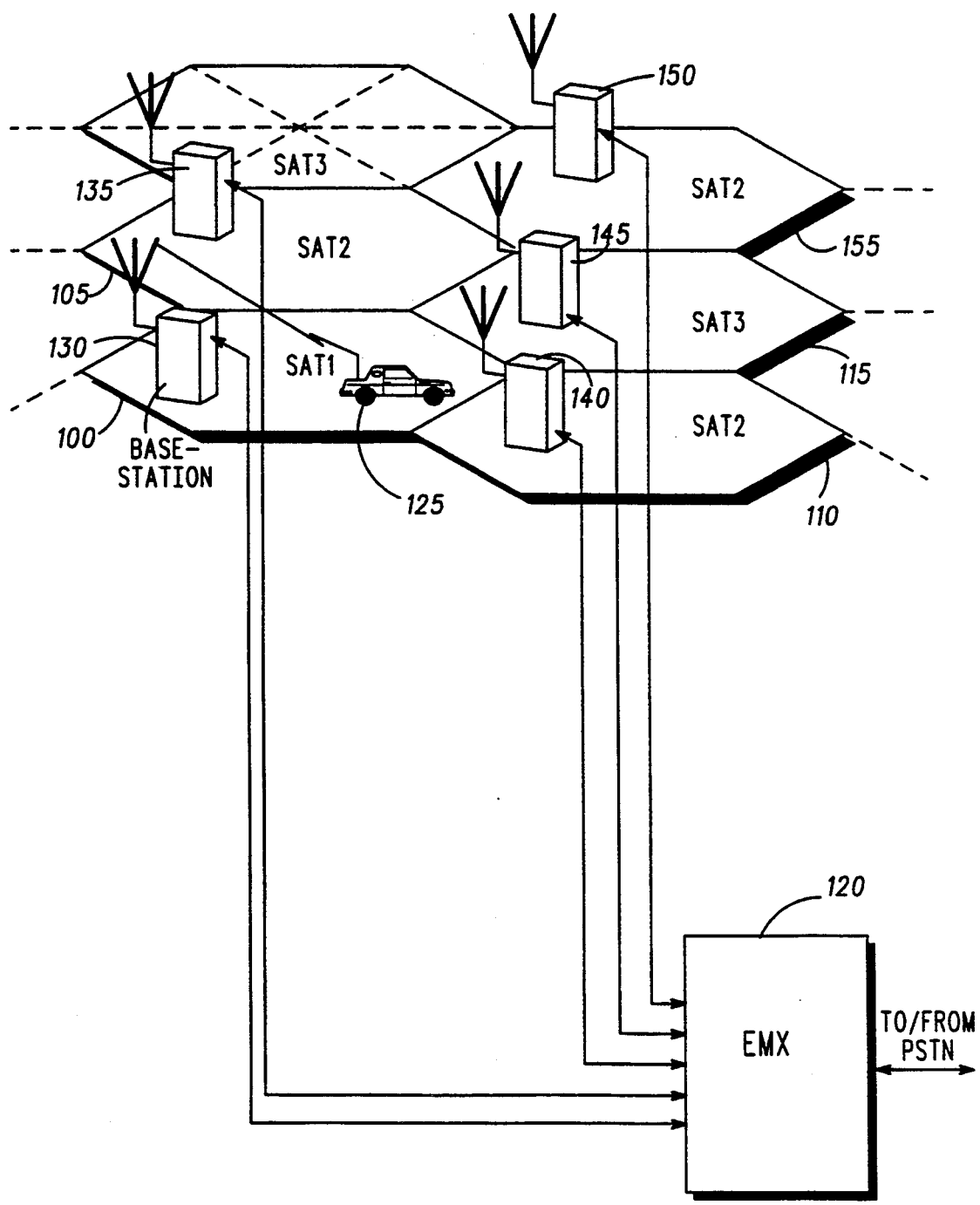
FIG. 1 generally depicts base-stations coupled to an EMX in a radiotelephone system that may be used to employ the present invention.

FIG. 1 generally depicts a cellular network which may employ the present invention. Cellular networks may incorporate as many different cells as is required to accommodate the coverage area. For example, a cell 100 typically covers only a small portion of the total coverage area in large cellular systems. As the cellular network grows in a particular coverage area, frequency reuse becomes an important parameter that is used to accommodate all the subscribers necessary. In some analog radiotelephone systems, a supervisory audio tone (SAT) is used to distinguish two different RF channels transmitting at the same frequencies in two different cells. Returning to FIG. 1, a first coverage area or cell 100 using a $SAT_1$ is bounded by six neighboring cells, but only three neighboring cells are used for explanation purposes. A second coverage area, or neighboring cells 105, 110 have a SAT of $SAT_2$ while still another neighboring cell 115 has a SAT of $SAT_3$. Each of these cells has its own base-station, which is required to communicate to a subscriber 125. In the source cell 100, a source base-station 130 communicates to a subscriber 125 on a source channel, which is a radio frequency (RF) signal at a particular frequency. $SAT_1$ is modulated on the RF signal by the source base-station 130 and is demodulated by the subscriber 125. $SAT_1$ is used by the subscriber 125 to identify the source cell 100 the subscriber 125 is located within. In sectorized cells (not shown), a similar method of communication transfer (called a port change) is used when the subscriber 125 moves from sector to sector within a given cell.

Each base-station within a particular cell in a cellular network is connected to an EMX 120 switch, available from Motorola, Inc. and described in Motorola Instruction Manual No. 68P81054E59 published by Motorola Service Publications, Schaumburg, IL. The EMX 120, and more particularly the three party circuit (not shown) in the EMX 120, is the interface between the base-stations within the cells and the public switched telephone network (PSTN), which is the land-line system. The EMX 120 also serves as a junction point between base-stations in a cellular network. For example, as the subscriber moves throughout the source cell 100, the base-station 130 continuously monitors the received signal strength indication (RSSI) of the subscriber 125. As the subscriber 125 moves away from the base-station 130, the RSSI of the subscriber 125 eventually falls below a transfer threshold. The source base-station 130, via the EMX 120, sends a message, which includes the source RSSI measurement, to all neighboring cells, but again for the example only neighboring cells 105, 110 are used. If target base-stations 135, 140 receive the transmission of the subscriber 125 and if the handoff criterion is met for the particular cell 105, 110, the target base-stations 135, 140 will send a response to the EMX 120 noting such. Target base-station 135, 140 will meet the handoff criterion if the RSSI measured at the target base-stations 135, 140, plus some hysteresis value is greater than the RSSI measured by the source base-station 130. The hysteresis value is used by neighboring base-stations 135, 140 in part to take into account the physically different locations of the target base-stations 135, 140 with respect to the source base-station 130. In addition, to ensure that the target base-station 135, 140 RSSI is noticeably better than the source base-station 130 RSSI, the hysteresis value is added to the target base-station 135, 140 RSSI before the comparison is made.

Each of the base-stations 130, 135, 140, 145, and 150 includes a plurality of transmitters and receivers for operating on at least one duplex signalling channel and a plurality of duplex voice channels. One conventional analog system employs transmitters and receivers of the type described in Motorola Instruction Manual No. 68P81058E32-A published by Motorola Service Publications, Schaumburg, Ill., in 1989. The use of mobile assisted handoff (MAHO) is particularly applicable to digital cellular systems. Several of the systems that incorporate MAHO are the United States Digital Cellular System (USDC) defined in EIA/TIA, Project Number 2215 titled "*Dual—Mode Mobile Station—Base-station Compatibility Standard*" dated Dec. 1989, the Japan Digital Cellular Standard (JDC) defined by the *Research and Development Center for Radio Systems in Japan (RCR)*, dated Jan. 1991, and the Groupe Special Mobile (GSM) Pan European Digital Cellular System defined in the *GSM Recommendations*. As is the case in analog cellular systems, digital cellular systems use a cell identification value. Several such digital cellular systems use a digital voice colour code (DVCC). In the preferred embodiment, up to 256 DVCC's are available. Thus, in a given cellular coverage area, each cell has a distinct DVCC associated to a corresponding base-station. When the base-station transmits a broadcast signal throughout its coverage area, the broadcast signal has the DVCC value modulated on it. This concept is similar to the SAT concept used in analog cellular.

Figure 2:
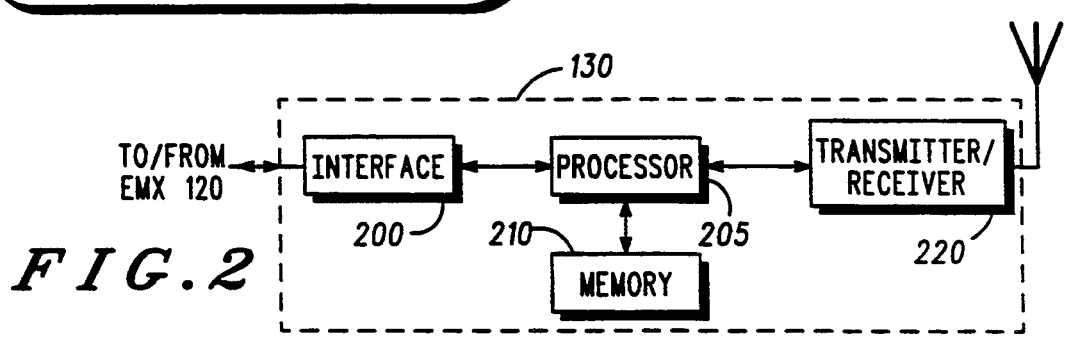
FIG. 2 generally depicts a schematic diagram of the source base-site and the target base-sites shown in FIG. 1.

FIG. 2 generally depicts a block diagram of a base-station used to implement the present invention. FIG. 2 depicts the source base-station 130 but may also be used to generally depict all base-stations, as shown in FIG. 1. An interface 200 connects the base-station 130 to the EMX 120. The interface 200 is coupled to a processor, which in the preferred embodiment is a Motorola 68030 microprocessor. The processor 205 is also coupled to a memory block 210, which includes RAM and ROM. The processor 205 is coupled to a transmitter/receiver 220 which interfaces between the processor and the channel being transmitted by the base-station 130. Data entering the base-station 130 from the EMX 120 is input into the interface 200 and sent to the processor 205. The processor 205 accesses the memory 210 to retrieve the required calibration/hysteresis factors necessary for transmission and reception. The processor 205 sends the data to the transmitter/receiver 220, where the information is modulated onto a RF channel and transmitted to the subscriber unit 125.

Current radiotelephone systems limit the maximum power level transmitted by the subscriber to a level below the maximum power level that the subscriber unit 125 is capable of transmitting in. The MAXPL parameter was set below the maximum capable power level because interference would increase if the subscriber unit 125 were allowed to transmit at its maximum capable power level. For very dense coverage areas, this interference could potentially lead to an increase in dropped calls. The problem with the MAXPL parameter is that it limits the power level at all times. Logically, however, if the subscriber unit 125 is in the best sector/cell at the time where a power level increase is required, and the subscriber is at MAXPL, an increase in the subscriber unit 125 power level should not affect neighboring sectors/cells. Thus, allowing a subscriber unit 125 to transmit at a power level above MAXPL will not increase interference with neighboring sector/cells if, at the time the power increase is required, the subscriber unit 125 is in the optimum or best sector/cell.

Figure 3:
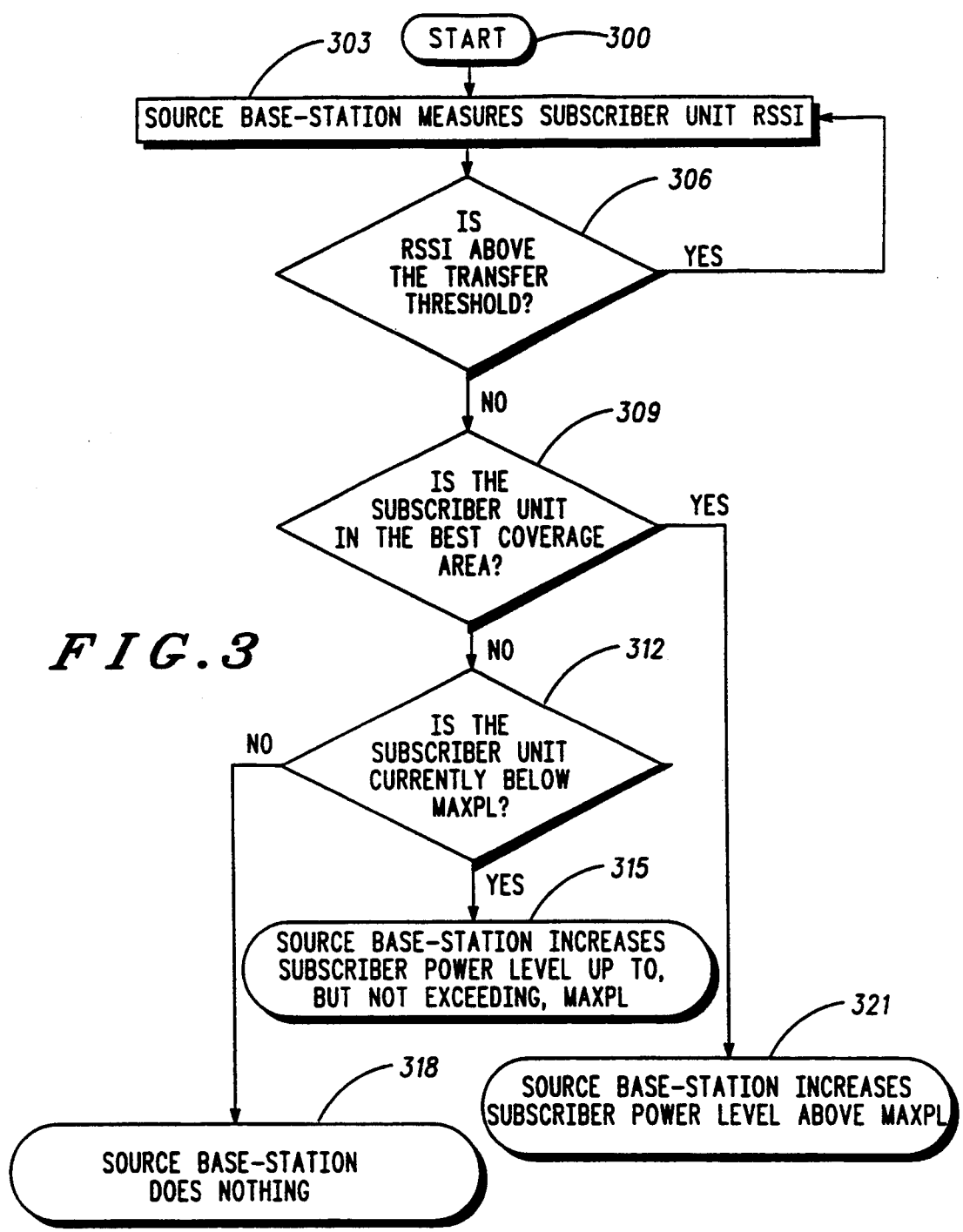
FIG. 3 generally depicts in flow diagram form how a radiotelephone system increases a subscriber's power level above MAXPL in accordance with the invention.

FIG. 3 generally depicts the steps a radiotelephone system undergoes to increase the subscriber power level above MAXPL in accordance with the invention. The process starts at 300 when the source base-station 130 measures at 303 the subscriber unit RSSI. A test is then performed at 306 to determine if the RSSI is above the transfer threshold. In the preferred embodiment, the transfer threshold is the power change threshold used to vary the subscriber unit 125 power level. If it is, the test at 303 is repeated. If the measured RSSI is not above the transfer threshold, a test is performed at 309 to determine if the subscriber unit 125 is in the best coverage area. If it is, the source base-station 130 increases at 321 the subscriber power level above the MAXPL if necessary. If the subscriber unit 125 is not in the best coverage area, a test is performed at 312 to determine if the subscriber units power level is currently below MAXPL. If it is, the source base-station 130 will increase at 315 the subscriber power level up to, but not exceeding, MAXPL. If the subscriber unit 125 is currently transmitting at or above MAXPL and the subscriber unit 125 is not in the best coverage area, the source base-station will do nothing 318.

Figure 4:
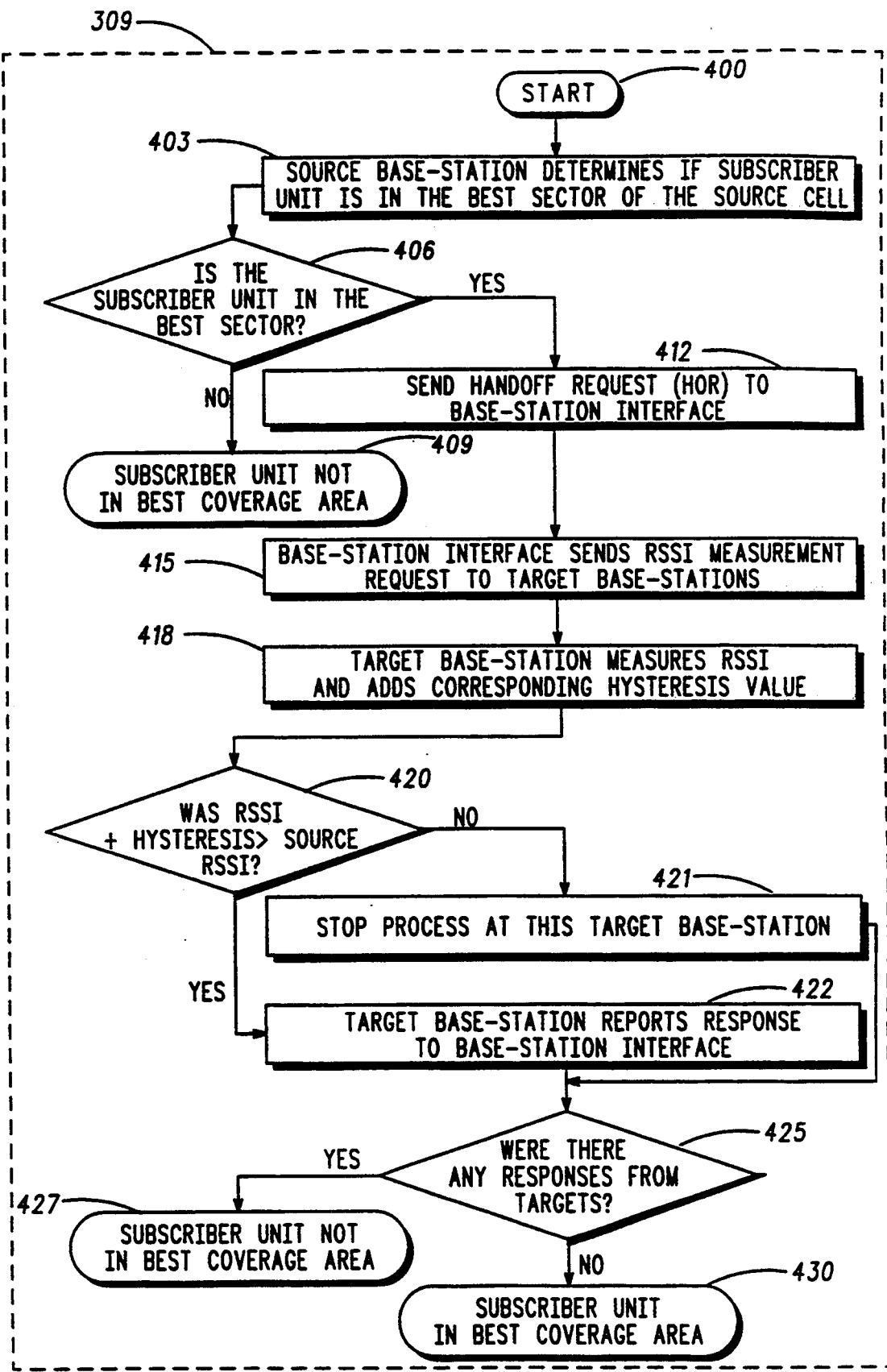
FIG. 4 generally depicts how a radiotelephone system without MAHO determines if a subscriber is in the best coverage area.

FIG. 4 generally depicts how a radiotelephone system without MAHO determines if the subscriber unit 125 is in the best coverage area as shown in step 309. This process starts at 400 when the source base-station determines at 403 if the subscriber unit is in the best sector of the source cell. A test is then performed at 406 to determine if the subscriber unit is in the best sector. If it is not, a determination is made at 409 that the subscriber unit is not in the best coverage area. If, however, the subscriber unit 125 is in the best sector, the source base-station 130 will send at 412 a hand-off request (HOR) to the base-station interface 120. The base-station interface 120 then sends at 415 an RSSI measurement request to neighboring target base-stations. The target base-stations measure at 418 the subscriber unit 125 RSSI and add the corresponding hysteresis value for each particular target base-station to the measured RSSI. A test is then performed at 420 to determine if the measured RSSI plus hysteresis for a target base-station is greater than the source RSSI. If it is not, the process stops at 421 at the particular target base-station. If the measured RSSI plus hysteresis for a target base-station is greater than the source RSSI, the target base-station reports at 422 a response back to the base-station interface 120. A test is then performed at 425 by the base-station interface 120 to determined if any target base-stations responded. If any did respond, the subscriber unit 125 is not in the best coverage area 427. If, however, no target base-stations responded, the subscriber unit 125 is in the best coverage area 430.

Figure 5:
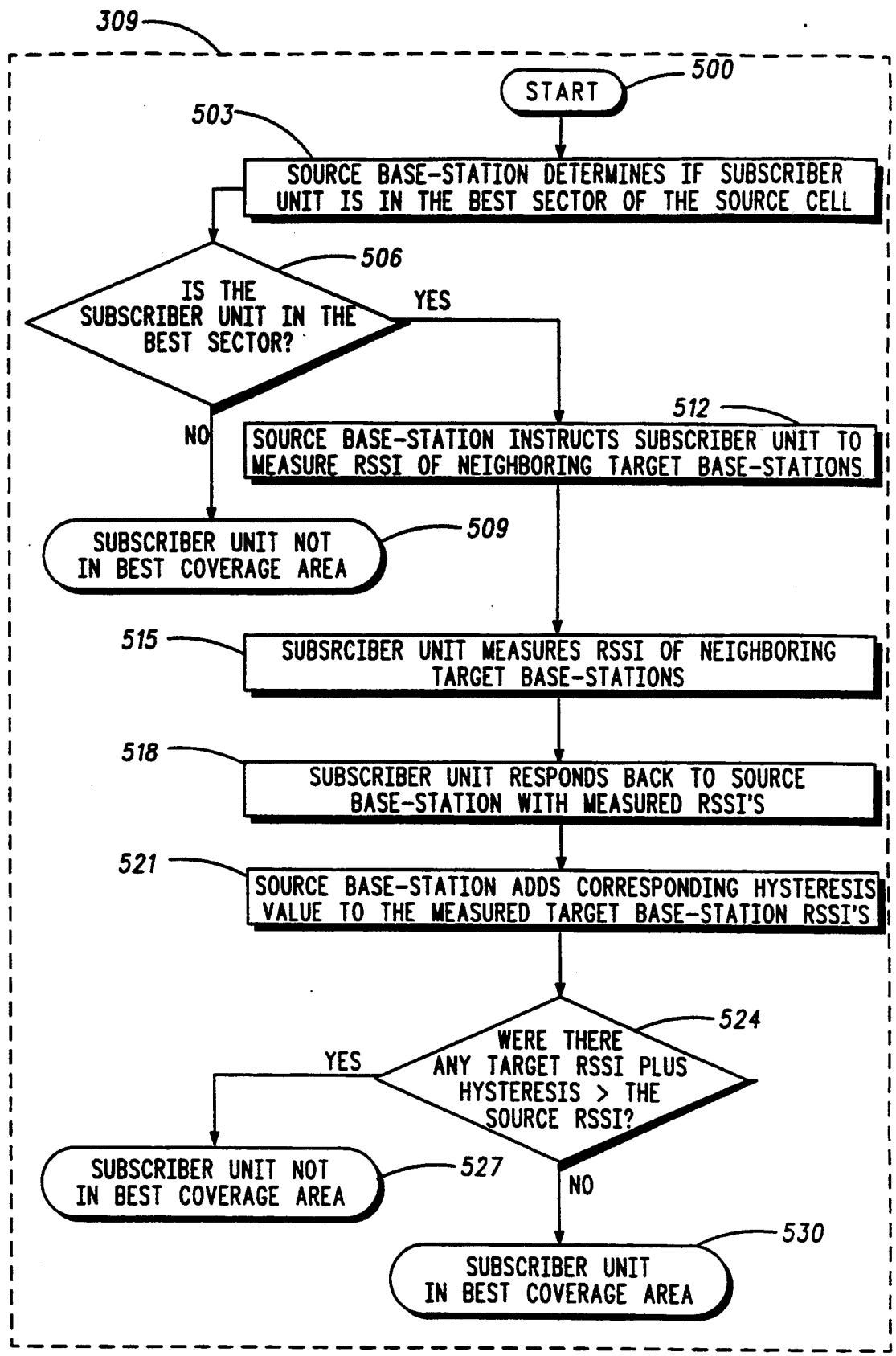
FIG. 5 generally depicts how a radiotelephone system with MAHO determines if a subscriber is in the best coverage area.

FIG. 5 generally depicts how a radiotelephone system with MAHO determines if the subscriber unit 125 is in the best coverage area as shown in step 309. This process starts at 500 when the source base-station determines at 503 if the subscriber unit is in the best sector of the source cell. A test is then performed at 506 to determine if the subscriber unit is in the best sector. If it is not, a determination is made at 509 that the subscriber unit is not in the best coverage area. If, however, the subscriber unit 125 is in the best sector, the source base-station 130 will instruct at 512 the subscriber unit 125 to measure RSSI of neighboring target base-stations. The subscriber unit 125 then measures at 515 the RSSI of neighboring target base-stations. After the measurement, the subscriber unit 125 responds at 518 back to the source base-station 130 with the measured RSSI's. In an alternate embodiment, the subscriber unit 125 may determine the best of the measured RSSI's and respond back to the source base-station with only that RSSI. Continuing, the source base-station 130 adds at 521 the corresponding hysteresis value for each particular target base-station to the measured target base-station RSSI's. A test is then performed at 524 to determine if any of the measured RSSI plus hysteresis for any target base-station is greater than the source RSSI. If there are target RSSI plus hysteresis values greater than the source RSSI, the subscriber unit 125 is not in the best coverage area 527. If, however, the source RSSI is greater than all the RSSI plus hysteresis values, the subscriber unit 125 is in fact in the best coverage area 530.

By determining if the subscriber unit 125 is in the best sector/cell, the subscriber unit 125 is able to transmit above the predetermined MAXPL level set at the source base-station 130. In this manner, the subscriber unit 125 is able to maintain communication with the source base-station 130 without subjecting neighboring target base-stations to additional interference caused by high level subscriber transmission.

What I claim is:

1. A radiotelephone system having enhanced maximum power level usage, the radiotelephone system having a source base-station coupled to a plurality of target base-stations via a base-station interface, the source base-station communicating with a subscriber unit on a radio frequency (RF) channel, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum subscriber unit RF power level that said subscriber unit is capable to transmit, the radiotelephone system comprising:

means, at the source base-station, for providing at least a first communication transfer threshold;

means, at the source base-station, for measuring a first signal quality value of a transmission from said subscriber unit on said radio frequency channel;

means, at at least one target base-station, for measuring at least a second signal quality value of a transmission from said subscriber unit on said radio frequency channel;

means, at the base-station interface, for determining whether or not said subscriber unit is in the best coverage area based on said first signal quality value and said at least a second signal quality value; and means, at the source base-station, for instructing the subscriber unit to transmit at a level above said MAXPL when said first signal quality value is less than said at least a first communication transfer threshold and if said subscriber unit is in the best coverage area.

2. The radiotelephone system of claim 1 wherein said means for measuring a first signal quality value further comprises means for measuring a first signal strength value.

3. The radiotelephone system of claim 1 wherein said means for measuring at least a second signal quality value further comprises means for measuring at least a second signal strength value.

4. The radiotelephone system of claim 1 wherein said means for determining further comprises means for providing a hysteresis value correlating the physical location of the source base-station to said at least one target base-station.

5. The radiotelephone system of claim 4 wherein said means for determining further comprises means for adding said hysteresis value to said first signal quality value to produce a first modified signal quality value.

6. The radiotelephone system of claim 5 wherein said means for determining further comprises means for determining whether or not said subscriber unit is in the best coverage area based on said first modified signal quality value and said at least a second signal quality value.

7. A radiotelephone system having enhanced maximum power level usage, the radiotelephone system having a source base-station coupled to a plurality of target base-stations, the source base-station communicating with a subscriber unit on a source channel, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum subscriber unit RF power level that said subscriber unit is capable to transmit, the radiotelephone system comprising:

means, at the source base-station, for providing at least a first communication transfer threshold;

means, at a target base-station, for transmitting on at least a first target channel;

means, at the subscriber unit, for measuring a first signal quality value of a transmission on the source channel;

means, at the subscriber unit, for measuring at least a second signal quality value of said transmission on said at least a first target channel;

means, at the source base-station, for determining whether or not said subscriber unit is in the best coverage area based on said first signal quality value and said at least a second signal quality value; and means, at the source base-station, for instructing the subscriber unit to transmit at a level above said MAXPL when said first signal quality value is less than said at least a first communication transfer threshold and if said subscriber unit is in the best coverage area.

8. The radiotelephone system of claim 7 wherein said means for measuring a first signal quality value further comprises means for measuring a first signal strength value.

9. The radiotelephone system of claim 7 wherein said means for measuring at least a second signal quality value further comprises means for measuring at least a second signal strength value.

10. The radiotelephone system of claim 7 wherein said means for determining further comprises means for providing a hysteresis value correlating the physical location of the source base-station to said at least one target base-station.

11. The radiotelephone system of claim 10 wherein said means for determining further comprises means for adding said hysteresis value to said first signal quality value to produce a first modified signal quality value.

12. The radiotelephone system of claim 11 wherein said means for determining further comprises means for determining whether or not said subscriber unit is in the best coverage area based on said first modified signal quality value and said at least a second signal quality value.

13. A method of enhancing maximum power level usage in a radiotelephone system, the radiotelephone system having a source base-station coupled to a plurality of target base-stations via a base-station interface, the source base-station communicating with a subscriber unit on a radio frequency (RF) channel, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum subscriber unit RF power level that said subscriber unit is capable to transmit, the method comprising the steps of:

providing, at the source base-station, at least a first communication transfer threshold;

measuring, at the source base-station, a first signal quality value of a transmission from said subscriber unit on said radio frequency channel;

measuring, at at least one target base-station, at least a second signal quality value of a transmission from said subscriber unit on said radio frequency channel;

determining, at the base-station interface, whether or not said subscriber unit is in the best coverage area based on said first signal quality value and said at least a second signal quality value; and instructing, at the source base-station, the subscriber unit to transmit at a level above said MAXPL when said first signal quality value is less than said at least a first communication transfer threshold and if said subscriber unit is in the best coverage area.

14. The method of claim 13 wherein said step of measuring a first signal quality value further comprises the step of measuring a first signal strength value.

15. The method of claim 13 wherein said step of measuring at least a second signal quality value further comprises the step of measuring at least a second signal strength value.

16. The method of claim 13 wherein said step of determining further comprises the step of providing a hysteresis value correlating the physical location of the source base-station to said at least one target base-station.

17. The method of claim 16 wherein said step of determining further comprises the step of adding said hysteresis value to said first signal quality value to produce a first modified signal quality value.

18. The method of claim 17 wherein said step of determining further comprises the step of determining whether or not said subscriber unit is in the best coverage area based on said first modified signal quality value and said at least a second signal quality value.

19. A method of enhancing maximum power level usage in a radiotelephone system, the radiotelephone system having a source base-station coupled to a plurality of target base-stations, the source base-station communicating with a subscriber unit on a source channel, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum subscriber unit RF power level that said subscriber unit is capable to transmit, the method comprising the steps of:

providing, at the source base-station, at least a first communication transfer threshold;

transmitting, at a target base-station, on at least a first target channel;

measuring, at the subscriber unit, a first signal quality value of a transmission on the source channel;

measuring, at the subscriber unit, at least a second signal quality value of said transmission on said at least a first target channel;

determining, at the source base-station whether or not said subscriber unit is in the best coverage area based on said first signal quality value and said at least a second signal quality value; and instructing, at the source base-station, the subscriber unit to transmit at a level above said MAXPL when said first signal quality value is less than said at least a first communication transfer threshold and if said subscriber unit is in the best coverage area.

20. The method of claim 19 wherein said step of measuring a first signal quality value further comprises the step of measuring a first signal strength value.

21. The method of claim 19 wherein said step of measuring at least a second signal quality value further comprises the step of measuring at least a second signal strength value.

22. The method of claim 19 wherein said step of determining further comprises the step of providing a hysteresis value correlating the physical location of the source base-station to said at least one target base-station.

23. The method of claim 22 wherein said step of determining further comprises the step of adding said hysteresis value to said first signal quality value to produce a first modified signal quality value.

24. The method of claim 23 wherein said step of determining further comprises the step of determining whether or not said subscriber unit is in the best coverage area based on said first modified signal quality value and said at least a second signal quality value.

25. A radiotelephone system having enhanced maximum power level usage, the radiotelephone system having a source base-station communicating with a subscriber unit on a radio frequency (RF) channel within a first sector, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum capable subscriber unit RF power level that said subscriber unit is capable to transmit, the radiotelephone system comprising:

means, at the source base-station, for providing at least a first communication transfer threshold;

means, at the source base-station, for measuring a first signal quality value of a transmission from said subscriber unit on said radio frequency channel within the first sector;

means, at least one target base-station, for measuring at least a second signal quality value of a transmission from said subscriber unit on said radio frequency channel within a second sector;

means, at a base-station interface, for determining whether or not said subscriber unit is in the best sector based on said first signal quality value and said at least a second signal quality value; and means for instructing the subscriber unit to transmit at a level above said MAXPL when said first signal quality value is less than said at least a first communication transfer threshold and if said subscriber unit is in the best sector.

26. The radiotelephone system of claim 25 wherein said means for determining whether or not said subscriber unit is in the best sector may likewise occur at said source base-station.

27. A radiotelephone system having enhanced maximum power level usage, the radiotelephone system having a source base-station coupled to a plurality of target base-stations, the source base-station communicating with a subscriber unit on a radio frequency (RF) channel, the source base-station having the capability to instruct the subscriber unit to transmit at at least one of a plurality of RF power levels, the source base-station having a predetermined maximum subscriber unit transmission level value (MAXPL) corresponding to a predetermined subscriber unit RF power level that said subscriber unit is allowed to transmit, said MAXPL being below the maximum subscriber unit RF power level that said subscriber unit is capable to transmit, the radiotelephone system comprising:

means, at the source base-station, for providing at least a first communication transfer threshold;

means, at the source base-station, for measuring a first signal quality value of a transmission from said subscriber unit on said radio frequency channel;

means, at at least one target base-station, for measuring at least a second signal quality value of a transmission from said subscriber unit on said radio frequency channel;

means for determining whether or not said subscriber unit is in the best coverage area based on said first signal quality value and said at least a second signal quality value; and means, at the source base-station, for instructing the subscriber unit to transmit at a level above said MAXPL when said first signal quality value is less than said at least a first communication transfer threshold and if said subscriber unit is in the best coverage area.

* * * * *